United States Patent
Aakjer

(10) Patent No.: US 7,228,393 B2
(45) Date of Patent: Jun. 5, 2007

(54) MEMORY INTERLEAVING

(75) Inventor: Thomas Aakjer, Munich (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 358 days.

(21) Appl. No.: 10/877,573

(22) Filed: Jun. 25, 2004

(65) Prior Publication Data

US 2005/0278491 A1 Dec. 15, 2005

(30) Foreign Application Priority Data

Jun. 14, 2004 (EP) .................................. 04392031

(51) Int. Cl.
*G06F 12/00* (2006.01)
(52) U.S. Cl. ............................ 711/157; 711/5; 711/127
(58) Field of Classification Search ..................... None
See application file for complete search history.

(56) References Cited

U.S. PATENT DOCUMENTS

| 5,289,584 A | 2/1994 | Thome et al. ............... 395/325 |
| 6,026,473 A | 2/2000 | Cross et al. ................. 711/157 |
| 6,233,662 B1 | 5/2001 | Prince, Jr. .................... 711/157 |
| 6,292,873 B1 | 9/2001 | Keaveny et al. ............. 711/149 |
| 6,424,680 B1 | 7/2002 | Delaruelle et al. ........... 375/295 |
| 6,449,193 B1* | 9/2002 | Love et al. ............. 365/189.01 |
| 6,629,219 B1* | 9/2003 | Manseau ..................... 711/157 |
| 2003/0126343 A1 | 7/2003 | Olarig et al. ................ 710/306 |
| 2004/0125641 A1* | 7/2004 | Kang .......................... 365/145 |

* cited by examiner

*Primary Examiner*—Reginald Bragdon
*Assistant Examiner*—Ngoc Dinh
(74) *Attorney, Agent, or Firm*—Saile Ackerman LLC; Stephen B. Ackerman

(57) ABSTRACT

A central processor unit (CPU) accesses memory to read and write data and to read and execute program instructions. A problem arises when accessing slower Flash or electrically programmable read only memory (EPROM) with a faster CPU. A method and system has been devised which uses interleaving techniques and memory sub-sections. A memory interlace controller interfaces a faster CPU to several sub-sections of slower memory. The memory interlace controller interlaces the access of the slower memory and thus optimizing the CPU system speed.

26 Claims, 3 Drawing Sheets

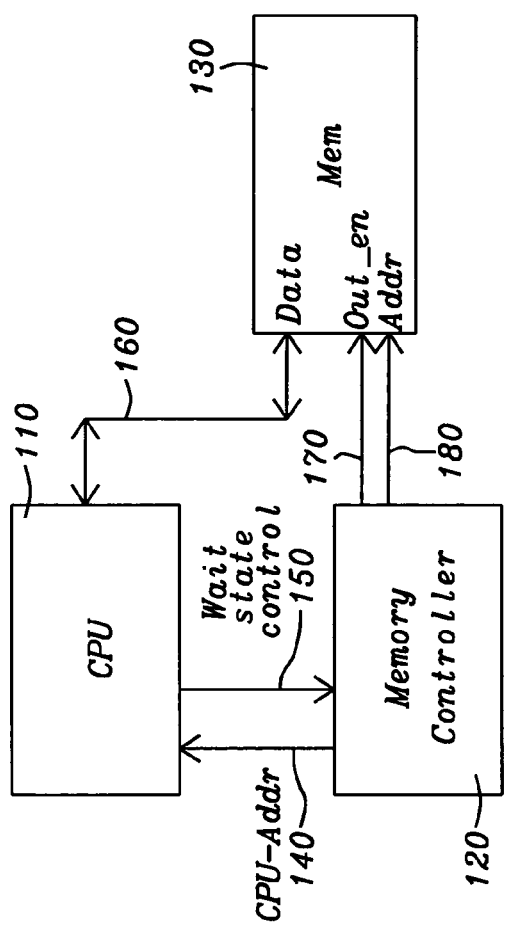
FIG. 1 – Prior Art
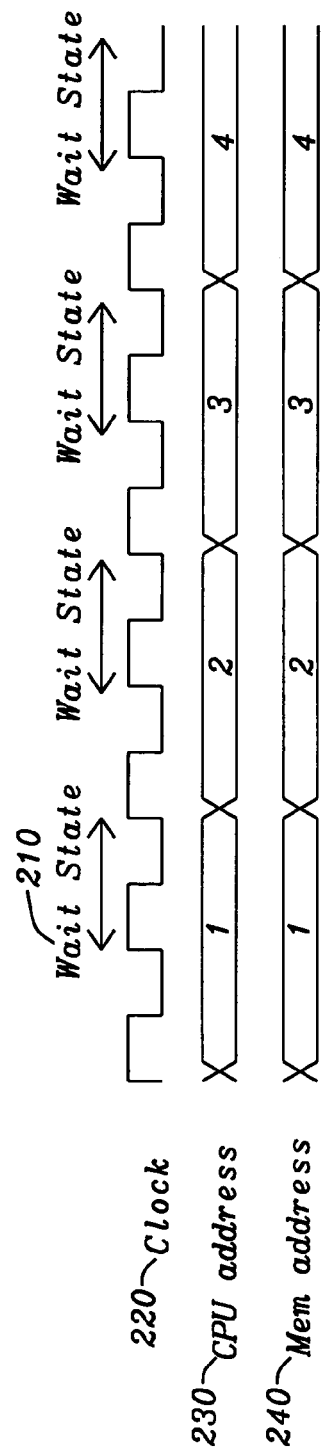
FIG. 2 – Prior Art

MEMORY INTERLEAVING

BACKGROUND OF THE INVENTION

1. Field of the Invention

The present invention generally relates to accessing memory from a central processing unit (CPU). More particularly, this invention relates to accessing slower Flash or electrically programmable read only memory (EPROM) with a faster CPU using interleaving techniques and memory sub-sections.

2. Description of the Prior Art

FIG. 1 shows a prior art block diagram of a memory 130 being accessed by a central processing unit (CPU) 110 using a memory controller 120. The CPU-Address bus 140 goes into the memory controller 120. The memory controller outputs a wait state control line 150, which goes into the CPU 110. For program execution directly from slow memories such as flash electrically programmed read only memories (EPROMS), the system performance may be limited by the program execution speed. The program execution speed is slowed down by the long access time of memory. The CPU has to "wait" for the memory access to be completed before continuing with the next CPU operation. The wait state control signal from the memory interface controller to the CPU performs this wait function. The memory controller is programmed via programmable read only memory (PROM) to issue wait states of 1, 2, 3, n CPU cycles. The value of n is chosen and programmed to match the slow speed of the chosen memory to the speed of the CPU. This wait state control signal tells the CPU to maintain the CPU-Addr 140 valid for longer periods of time until the wait state signal becomes inactive. Similarly, the memory controller 120 would maintain the Addr 180 valid longer also. For a CPU write operation, the wait state signal tells the CPU to maintain the Data to be written 160 valid for a longer period until the wait state signal becomes inactive. Similarly, for CPU Read operations, the wait state control causes the CPU Addr 140 address to be valid longer and it causes the out-en, output enable line 170 from the memory controller to the memory to remain valid longer.

FIG. 2 shows a timing diagram, which illustrates the workings of the prior art block diagram of FIG. 1. The FIG. 2 diagram shows the CPU clock 220, which paces the operation of the CPU and its system design. The CPU address 230 is the CPU-Addr 140 signal in FIG. 1. It is always kept valid for two CPU clock cycles as shown by the CPU address windows '1', '2', '3', & '4'.

The CPU-memory system design shown in FIG. 2 has one wait state added to each CPU cycle. A slower memory could have dictated that two wait state cycles be added to each CPU cycle. The mem address 240, which comes out of the memory controller in FIG. 1, is shown in FIG. 2 to be the same as the CPU address.

U.S. Pat. No. 6,424,680 (Delaruelle, et al.) describes a method of interleaving with low-speed memory. A digital signal is interleaved by delaying samples by an integral number times a unit delay in accordance with a cyclically repeated delay pattern. Select lines of a memory are cyclically activated at a cycle rate equal to unit delay. During the activation of a select line, both data is written and read from the memory. The data written comprises a relevant bit of each sample to be delayed in an integral number of sample groups. Each sample group is associated with one delay pattern cycle. The data read comprises a number of bits, which is equal to the number of bits written. The bits are read in accordance with the delay pattern.

U.S. Pat. No. 6,233,662 (Prince, Jr.) discloses a method and apparatus for interleaving memory across computer memory banks. The method optimizes the flexibility built into some interleavers by configuring an interleaver to improve the throughput of access to computer memory by maximizing the number of banks used for interleaving the memory. The present embodiment improves the process of spreading memory references across multiple memory banks to increase throughput of the memory system by configuring the control registers of an interleaver in a computer system. The present invention configures an interleaver so that it operates across "N" memory banks where "N" is not required to be a power of two.

U.S. Pat. No. 6,026,473 (Cross, et al.) describes a method and apparatus for storing data in a sequentially written memory using an interleaving mechanism. Data values are alternately stored in first and second data hold registers and then output by each data hold register for a time greater than a cycle period of the clock signal. Address values at which the incoming data values are to be written are alternately stored in first and second address hold registers. Data stored in the first data hold register is written to a latch-based memory element in a first memory bank indicated by an address value stored in the first address hold register. Data stored in the second data hold register is written to a latch-based memory element in a second memory bank indicated by an address value stored in the second address hold register.

SUMMARY OF THE INVENTION

It is therefore an object of the present invention to provide a method for accessing slower memory such as Flash or electrically programmable read only memory (EPROM) with a faster CPU using interleaving techniques and memory sub-sections. It is further an object of this invention to provide a system block diagram which describes the interaction of a memory interlace controller with a CPU and memory sub-sections.

The objects of this invention are achieved by a method of accessing memory using interleaving. The method comprises the steps of using a memory interlace controller to interface with a central processing unit (CPU) and memory, partitioning memory into a multiplicity of two or more memory subsections, and providing separate addresses from said memory interlace controller to said memory subsections.

In this method of accessing memory, the CPU places CPU addresses on CPU address lines going from the CPU to the memory interface controller. The memory interlace controller has a wait state control line from the memory interlace controller to the CPU. The memory interlace controller has a multiplicity of address busses going from the memory interface controller to each of the multiplicity of 2 or more memory subsections. The memory interlace controller outputs valid addresses sequentially in time for each of the multiplicity of 2 or more memory subsections. The memory interlace controller has a multiplicity of output enable signals going from the memory interlace controller to each of the multiplicity of 2 or more memory subsections. The memory interlace controller activates the output enable signals sequentially in time for each of the multiplicity of 2 or more memory subsections. The memory interlace controller detects a non-sequential memory access when the CPU addresses going from said CPU to the memory interlace controller, are non-sequential.

The above and other objects, features and advantages of the present invention will be better understood from the following detailed description taken in conjunction with the accompanying drawings.

BRIEF DESCRIPTION OF THE DRAWINGS

FIG. 1 is a prior art system block diagram showing a central processor unit, memory controller, and memory.

FIG. 2 is a prior art timing diagram showing CPU clock, CPU address, and memory address.

DESCRIPTION OF THE PREFERRED EMBODIMENT

Figure 3:
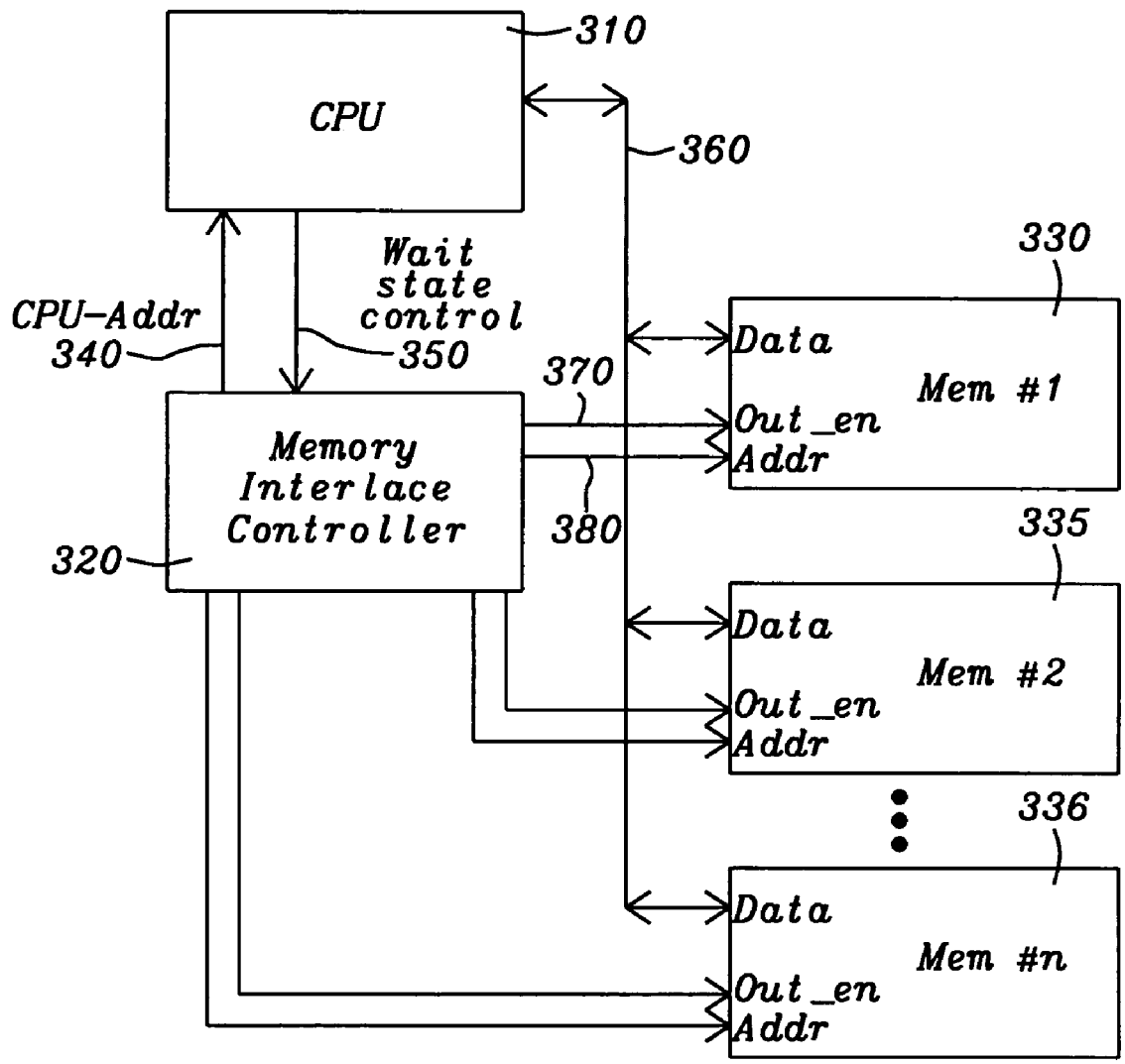
FIG. 3 shows the main embodiment system block diagram which shows the memory sub-sections and the memory interlace controller.

FIG. 3 shows a block diagram of the main embodiment of this invention. A CPU-memory system is shown. A CPU 310 interfaces with a memory interface controller 320 and with multiple memory sub-sections 330, 335, 336. The CPU Address bus 340 goes into the memory interlace controller 320. The memory interlace controller is a key component, since it directs sequential memory accesses to sequential memory sub-sections 330, 335, 336. This memory controller 320 is interlacing or interleaving sequential bytes of memory into sequential memory sub-sections. The memory controller has separate address busses for each memory sub-section 380. In addition, the memory controller has separate output enable lines 370 for each memory sub-section. On the other hand, in the embodiment of FIG. 3, the CPU has a common bi-directional data bus which goes to each of the memory sub-sections 330, 335, 336. However, the exact way of handling the data bus depends on the memories and CPU used. For some memories the data bus is bi-directional. On other memories, the data bus is not bi-directional. Also, on some memories the data outputs are enabled when the memory is being read. In this case the memory interlace control module, must ensure that only the data from the memory to be read as next is put on the CPU data bus, since as all memories are read simultaneously.

The memory interlace controller 340 outputs a wait state control line 350, which goes into the CPU 310. With this embodiment, the wait state control line is only needed when the CPU address progression is non-sequential. This occurs when the CPU instruction list encounters a branch instruction such as a JUMP instruction or a GOTO instruction.

When there is a non-sequential branch instruction or non-sequential data access of memory, the wait state control signal tells the CPU to maintain the CPU Addr 340 valid for longer periods of time until the wait state signal becomes inactive. In this case the memory interlace controller 320 maintains the Addr 380 valid longer. Similarly, for a CPU write operation, the wait state signal tells the CPU to maintain the Data to be written 360 valid for a longer period of time until the wait state signal becomes inactive. Similarly, for CPU Read operations, the wait state control causes the CPU-Addr address 340 to be valid longer. It also causes the out-en, output enable line 370 from the memory controller to the memory to remain valid longer.

When the CPU is accessing sequential instructions or sequential data, this embodiment uses memory interleaving as described above. Using memory interleaving, the memory is divided into more memory blocks. The memory blocks are addressed sequentially such that memory #1 (330) contains address #1, memory #2 (335) address #2 etc. When the microcontroller addresses the first memory at address #X, the other memories are activated and addressed with their memory address respectively (memory #2 with address #X+1) and using this 'look ahead' addressing, they will be ready with the data at the addresses #X+1, #X+2 when the microcontroller in the following cycle wants this data. For the case of sequential program execution, memory interleaving will effectively reduce the access time with the factor of memories used for the interleaving.

Figure 4:
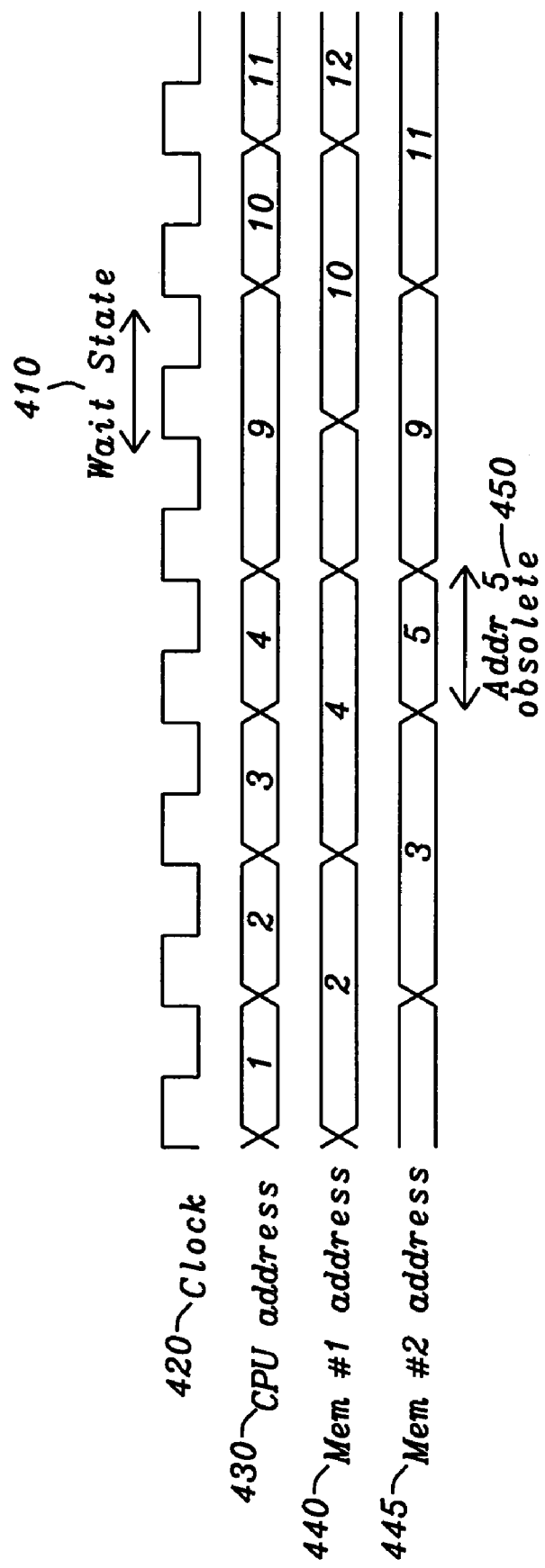
FIG. 4 shows the main embodiment timing diagram illustrating the interaction among the CPU clock, CPU address, and memory address.

The following is an example of memory interleaving using 2 memories. Mem#1 contains all even addresses and Mem#2 all uneven addresses. Considering the case where the memories need 2 clock cycles for a read access, FIG. 4 shows how the memory access is interleaved. When the memory accesses from the CPU are sequential, the memories are addressed with 'look ahead' (current CPU address +1). Thus when the CPU wants to read address 1 (located in Mem #2), Mem #1 is addressed with address=2 preparing for the CPU to read this address in the consecutive cycle. When the CPU shifts to address 2, Mem #1 will be addressed with address=4 preparing for the next read etc.

FIG. 4 shows a timing diagram which illustrates both sequential memory access as well as non-sequential memory access. The CPU clock 420 is shown. In addition, FIG. 4 shows the CPU address 430, the Mem#1 address 440, and the Mem#2 address 445. In the example shown in FIG. 4, sequential reading takes place for addresses 1–4 (430). Then, the CPU jumps to address 9. For the first 4 addresses the memory interleaving makes single cycle access possible. However, as soon as a jump occurs, the 'look ahead' is interrupted and a wait state 410 must be inserted to allow the memory access time of 2 clock cycles. In the example, the look ahead for address 5 450 is obsolete as the CPU jumps from address 4 to address 9, and a wait state has to be inserted to ensure access time for Mem #2.

The FIG. 4 shows an example where 2 memories eliminates the number of wait states for sequential memory access, because only 1 wait state is needed for single memory access. However for a case where 2 wait states are necessary for a memory access, the use of 3 memories will eliminate the number of wait states (for sequential access) as in FIG. 4. But also for a case where 2 wait states are necessary for a memory access, using 2 memories will cause the number of wait states to be reduced to 1 wait state for memory #1 and 0 wait states for memory #2. This results in an overall average 0.5 wait states. It should be emphasized that the memory interleaving does not necessarily mean 0 wait states per access, but that the average number of wait states will be reduced. A zero average wait state will only occur if the number of memories equals the number of clock cycles per memory access.

Below is a table which summarizes the average system wait state as a function of memory wait state required and the number of memory sub-sections.

| Number of Memory Wait States Required | Number of Memory Sub-sections | Average Wait State for Sequential Access |
| --- | --- | --- |
| 0 | 1 | 0 |
| 1 | 1 | 1 |
| 1 | 2 | 0 |
| 2 | 1 | 2 |
| 2 | 2 | 0.5 |

-continued

| Number of Memory Wait States Required | Number of Memory Sub-sections | Average Wait State for Sequential Access |
|---|---|---|
| 2 | 3 | 0 |
| 3 | 1 | 3 |
| 3 | 2 | 1 |
| 3 | 3 | 0.33 |
| 3 | 4 | 0 |

The advantages of this invention are that the fast speed of today's CPUs can be matched to work with slow flash EPROM memories. Using the memory interlace controller to interface between the CPU and the 'n' memory sub-sections, a computer system designer can optimize the CPU system speed. The value of 'n', the number of memory sub-sections, is chosen to reduce the access time by a factor, 1/n.

While the invention has been described in terms of the preferred embodiments, those skilled in the art will recognize that various changes in form and details may be made without departing from the spirit and scope of the invention.

What is claimed is:

1. A method of accessing memory using interleaving comprising the steps of:
    using a memory interlace controller to interface with a central processing unit (CPU) and memory,
    partitioning memory into a multiplicity of two or more memory subsections, and
    providing separate addresses from said memory interlace controller to said memory subsections, wherein said CPU has CPU addresses on CPU address lines going from said memory interface controller, wherein said memory interlace controller stores said CPU address as a previous CPU address after said memory interlace controller decodes said CPU address from said CPU.

2. The method of accessing memory using interlacing of claim 1 wherein said memory interlace controller has a wait state control line from said memory interlace controller to said CPU, wherein said memory interlace controller has the means to select a variable number of wait states.

3. The method of accessing memory using interlacing of claim 2 wherein said memory interlace controller activates said wait state control line from said memory interlace controller to said CPU when said CPU addresses are non-sequential.

4. The method of accessing memory using interlacing of claim 3 wherein said memory interlace controller has the means to reduce said number of said wait states when said multiplicity of said memory sub-sections is increased when said CPU addresses are sequential.

5. The method of accessing memory using interlacing of claim 1 wherein said memory interlace controller has a multiplicity of address busses going from said memory interface controller to each of said multiplicity of 2 or more memory subsections.

6. The method of accessing memory using interlacing of claim 1 wherein said memory interlace controller outputs valid addresses sequentially in time for each of said multiplicity of 2 or more memory subsections.

7. The method of accessing memory using interlacing of claim 1 wherein said memory interlace controller has a multiplicity of output enable signals going from said memory interlace controller to each of said multiplicity of 2 or more memory subsections.

8. The method of accessing memory using interlacing of claim 7 wherein said memory interlace controller activates said output enable signals sequentially in time for each of said multiplicity of 2 or more memory subsections.

9. The method of accessing memory using interlacing of claim 1 wherein said memory interlace controller detects a non-sequential memory access when said CPU addresses going from said CPU to said memory interlace controller, are non-sequential.

10. The method of accessing memory using interlacing of claim 1 wherein said memory interlace controller stores said CPU address as a current CPU address before said memory interlace controller decodes said CPU address from said CPU.

11. The method of accessing memory using interlacing of claim 1 wherein said memory interlace controller detects a sequential memory access when said CPU addresses going from said CPU to said memory interlace controller are sequential.

12. The method of accessing memory using interlacing of claim 1 wherein said memory interlace controller detects that said CPU addresses are sequential and then addresses said memory subsections with address "look ahead" where a next CPU address is assumed to equal present CPU address plus 1.

13. The method of accessing memory using interlacing of claim 1 wherein said memory interlace controller determines valid addresses, for each of said multiplicity of 2 or more memory subsections, based on said present CPU address and said previous CPU address.

14. A system for accessing memory using interleaving comprising:
    a memory interlace controller to interface with a central processing unit (CPU) and memory,
    a multiplicity of two or more memory subsections, and
    separate addresses from said memory interlace controller to said memory subsections, wherein said CPU has CPU addresses on CPU address lines going from said CPU to said memory interface controller, wherein said memory interlace controller stores said CPU address as a previous CPU address after said memory interlace controller decodes said CPU address from said CPU.

15. The system of accessing memory using interlacing of claim 14 wherein said memory interlace controller has a wait state control line from said memory interlace controller to said CPU, wherein said memory interlace controller has the means to select a variable number of wait states.

16. The system of accessing memory using interlacing of claim 15 wherein said memory interlace controller activates said wait state control line from said memory interlace controller to said CPU when said CPU addresses are non-sequential.

17. The system of accessing memory using interlacing of claim 15 wherein said memory interlace controller has the means to reduce said number of said wait states when said multiplicity of said memory sub-sections is increased when said CPU addresses are sequential.

18. The system of accessing memory using interlacing of claim 14 wherein said memory interlace controller has a multiplicity of address busses going from said memory interface controller to each of said multiplicity of 2 or more memory subsections.

19. The system of accessing memory using interlacing of claim 14 wherein said memory interlace controller outputs valid addresses sequentially in time for each of said multiplicity of 2 or more memory subsections.

20. The system of accessing memory using interlacing of claim 14 wherein said memory interlace controller has a multiplicity of output enable signals going from said memory interlace controller to each of said multiplicity of 2 or more memory subsections.

21. The system of accessing memory using interlacing of claim 20 wherein said memory interlace controller activates said output enable signals sequentially in time for each of said multiplicity of 2 or more memory subsections.

22. The system of accessing memory using interlacing of claim 14 wherein said memory interlace controller detects a non-sequential memory access when said CPU addresses going from said CPU to said memory interlace controller, are non-sequential.

23. The system of accessing memory using interlacing of claim 14 wherein said memory interlace controller stores said CPU address as a current CPU address before said memory interlace controller decodes said CPU address from said CPU.

24. The system of accessing memory using interlacing of claim 14 wherein said memory interlace controller detects a sequential memory access when said CPU addresses going from said CPU to said memory interlace controller are sequential.

25. The system of accessing memory using interlacing of claim 14 wherein said memory interlace controller detects that said CPU addresses are sequential and then addresses said memory subsections with address "look ahead" where a next CPU address is assumed to equal present CPU address plus 1.

26. The system of accessing memory using interlacing of claim 14 wherein said memory interlace controller determines valid addresses, for each of said multiplicity of 2 or more memory subsections, based on said present CPU address and said previous CPU address.

* * * * *